US008837723B2

(12) United States Patent
Depietro et al.

(10) Patent No.: US 8,837,723 B2
(45) Date of Patent: Sep. 16, 2014

(54) METHOD AND APPARATUS FOR USE IN A DOWNLOADABLE CONDITIONAL ACCESS SYSTEM

(75) Inventors: Mark G. Depietro, Harleysville, PA (US); George T. Hutchings, Doylestown, PA (US)

(73) Assignee: General Instrument Corporation, Horsham, PA (US)

( * ) Notice: Subject to any disclaimer, the term of this patent is extended or adjusted under 35 U.S.C. 154(b) by 915 days.

(21) Appl. No.: 11/764,292

(22) Filed: Jun. 18, 2007

(65) Prior Publication Data

US 2008/0313463 A1 Dec. 18, 2008

(51) Int. Cl.
*H04N 7/167* (2011.01)
*H04L 9/32* (2006.01)
*H04N 21/426* (2011.01)
*H04N 21/418* (2011.01)
*H04N 21/436* (2011.01)
*H04N 21/4408* (2011.01)

(52) U.S. Cl.
CPC .... *H04N 21/42623* (2013.01); *H04L 2209/603* (2013.01); *H04L 2209/605* (2013.01); *H04N 7/1675* (2013.01); *H04N 21/4181* (2013.01); *H04N 21/436* (2013.01); *H04N 21/4408* (2013.01); *H04L 2209/601* (2013.01)
USPC ............ 380/239; 380/231; 713/170; 713/171

(58) Field of Classification Search
USPC .......................................................... 380/239
See application file for complete search history.

(56) References Cited

U.S. PATENT DOCUMENTS

| 6,744,892 | B2 | 6/2004 | Akins, III et al. |
| 2002/0083438 | A1 | 6/2002 | So et al. |
| 2006/0059342 | A1 | 3/2006 | Medvinsky et al. |
| 2008/0037782 | A1* | 2/2008 | Morten ......................... 380/239 |
| 2008/0095366 | A1* | 4/2008 | Taniguchi .................... 380/239 |
| 2008/0098212 | A1* | 4/2008 | Helms et al. .................. 713/155 |
| 2008/0177998 | A1* | 7/2008 | Apsangi et al. ............... 713/155 |

OTHER PUBLICATIONS

Office Action mailed on Aug. 1, 2011 in Great Britain Patent Application No. GB 0919630.4.
Office Action mailed on Feb. 3, 2012 in Great Britain Patent Application No. GB 0919630.4.
Office Action mailed on May 3, 2012 in Canadian Patent Application No. CA 2688581.
Notice of Allowance mailed on Jul. 30, 2013 in Canadian Patent Application No. CA 2688581.
International Search Report with written opinion for International Application No. PCT/US2008/067174 mailed on Sep. 25, 2008.

* cited by examiner

*Primary Examiner* — Fatoumata Traore
(74) *Attorney, Agent, or Firm* — Lori Anne D. Swanson

(57) ABSTRACT

In a downloadable conditional access system (DCAS), preferably all DCAS-specific code is implemented in a configurable secure (CS) processor that is in communication with the host processor. Preferably, no DCAS-specific code is executed in the host processor. The host processor delivers commands to the CS processor, which the CS processor performs to configure itself in accordance with the particular DCAS encryption scheme used by the DCAS. Once configured, the CS processor executes a DCAS software module that has been downloaded to the CS processor, which looks for the corresponding EMMs and ECMs, processes them to obtain the CW, and then uses the CW to decrypt the content stream.

15 Claims, 5 Drawing Sheets

METHOD AND APPARATUS FOR USE IN A DOWNLOADABLE CONDITIONAL ACCESS SYSTEM

TECHNICAL FIELD OF THE INVENTION

The invention relates to conditional access (CA) systems for controlling access to content distributed in cable or satellite television networks. More particularly, the invention relates to enabling different types of CA systems to be used by a set-top box (STB) without having to implement CA system-specific code in the host processor of the STB.

BACKGROUND OF THE INVENTION

Control of access to content has become a vital aspect of many business models in the digital television broadcasting industry. Various conditional access (CA) systems are or have been used in the industry to control, or limit, access to digital television services such as, for example, pay-per-view programming services, premium channel (e.g., HBO) programming services, and video-on-demand programming services. CA systems prevent subscribers from accessing services unless certain conditions are met (e.g., the subscriber has entered into an agreement to pay for a service).

CA systems encrypt digital content streams so that the streams can only be accessed by equipment at the subscriber's premises that has the proper hardware and/or software configuration for decrypting the digital content stream. Therefore, the CA system can be viewed as having a first portion external to the subscriber premises somewhere in the network that encrypts the digital content stream, and a second portion located at the subscriber's premises, which decrypts the digital content stream to enable the subscriber to acquire the service. The second portion is typically located in a STB at the subscriber's premises, but may also be incorporated into a Cablecard or Smartcard that interfaces with a digital cable-ready television or other device.

In the United States, the first and second portions of a particular CA system have traditionally been specific to a particular manufacturer. The digital content stream is encrypted in accordance with a particular manufacturer's CA system encrypting scheme, and that encryption scheme is proprietary and not available to the public. Therefore, the decrypting hardware and/or software configuration in the STB needs to be specifically designed or configured to decrypt the digital content stream. Consequently, if a particular manufacturer's CA system is used at the headend, the STB is typically provided by the same manufacturer. In Europe, a single encryption scheme called the Common Scrambling Algorithm (CSA) is used to encrypt the content stream. The CSA technology is available for license by manufacturers of subscriber premises equipment.

Recently, downloadable CA systems (DCASs) have been proposed that will enable STBs to be used with different CA systems, provided the STBs employ standard DCAS capability. DCAS technology eliminates the need to implement a particular CA-system specific hardware architecture in the STB or in a cable card at the subscriber's premises in order to decrypt the encrypted content stream. Instead, a CA system software module is securely downloaded from the network to the subscriber's STB. The downloaded software module is executed by a programmable secure processor within the STB to enable the STB to decrypt the digital content stream to enable the user to access the content.

FIG. 1 illustrates a block diagram of a proposed DCAS configuration intended to be employed in a STB 11. A host processor 12 of the STB 11 is programmed to execute a DCAS kernel that is specific to the particular CA system to be used. The STB 11 sends a request to download a DCAS software module to a downloading facility 14, which is typically operated by the network operator that services the subscriber's premises. The DCAS software module transmitted in response to the request is downloaded to the STB 11. The downloaded DCAS software suite is made up of separate modules that are executed by a secure processor 13 and the host processor 12.

The CA system software module executed by the host processor 12 controls sending and receiving of messages and commands to and from the secure processor 13 and to and from a transport processor 15. The CA system software module executed by the secure processor 13 responds to messages from the host processor 12. Commands received by the transport processor 15 from the host processor 12 are performed by the transport processor 15 to cause the transport processor 15 to configure itself to look for particular Entitlement Control Messages (ECMs) and Entitlement Management Messages (EMMs) that are transported either as part of the encrypted content stream, or in logically-related data streams. The ECM contains access criteria and a CAS-encrypted content decryption key called a control word (CW). The EMM is an encrypted message that contains private conditional access information about the authority a subscriber has to acquire content.

When the transport processor 15 locates the EMM and ECM, it forwards these messages to the host processor 12. The host processor 12 forwards the ECM and EMM to the secure processor 13, which is executing the downloaded CA system software module. The secure processor 13 checks the EMM to determine whether the subscriber is authorized to access the content. If so, the secure processor 13 decrypts the ECM and obtains the CW, which is then sent to the host processor 12. The host processor 12 sends the CW to the transport processor 15, which it uses to decrypt the content stream. If the EMM does not indicate that the subscriber has authorization to access the content, the encrypted content stream will not be decrypted.

One of the disadvantages of the DCAS technology described above is that the host processor 12 must be configured to execute some portion of the DCAS kernel. Different STBs use different types of host processors. Therefore, a DCAS kernel designer is faced with potentially having to design a different DCAS kernel for each different type of host processor, which increases the amount of work and the costs associated with implementing a given DCAS. Another disadvantage of the DCAS technology described above is that it allows CA system-specific code to reside in the unsecure host processor 12. This increases the observability of certain aspects of the CA system, and could potentially lead to the disclosure of security vulnerabilities that may be exploited by individuals who are attempting to break the CA system to gain unauthorized access. Another disadvantage of the DCAS technology described above is that because specific code must reside on the host processor, the code cannot be written only once, but must be ported for each instance of the host processor and operating system that will be encountered in the field.

In addition, the control word (CW) is transmitted from the secure processor 13 to the unsecure host processor 12 and then to the transport processor 15. While in most instances, the control word is transmitted in an encrypted form, this code words is still accessible in this state to pirates and hackers. Thus, it is possible that one could obtain the CW and potentially decrypt it and obtain the content inappropriately.

Accordingly, a need exists for a downloadable CA system that does not require that the host processor execute CA system-specific code or functionality and that is not vulnerable to security risks.

SUMMARY OF THE INVENTION

The invention provides a method and an apparatus for use in a downloadable conditional access system (DCAS). The apparatus comprises a host processor and a configurable secure (CS) processor. The CS processor is configured to receive DCAS commands and stream processing commands from the host processor and to configure itself in accordance with the received commands. Once configured, the CS processor executes a DCAS software module that has been downloaded to the CS processor, which parses and decrypts the encrypted content stream.

In accordance with the method, a first downloaded conditional access system (DCAS) software module is received in a configurable secure (CS) processor. A first set of DCAS commands and stream processing commands is received in the CS processor, which are sent to the CS processor by the host processor. The CS processor configures itself in accordance with the CAS commands and stream processing commands. An encrypted content stream is received in the CS processor. The DCAS software module in the CS processor is executed, which parses and decrypts the encrypted content stream.

The invention also provides a computer program for use in a DCAS. The program comprises instructions for receiving a first DCAS software module in a configurable secure (CS) processor, instructions for receiving a first set of DCAS commands and stream processing commands in the CS processor sent by a host processor that cause the CS processor to configure itself, instructions for receiving an encrypted content stream in the CS processor, and instructions for executing the DCAS software module in the CS processor. When the CS processor executes the DCAS software module, the CS processor parses and decrypts the encrypted content stream.

These and other features and advantages of the invention will become apparent from the following description, drawings and claims.

DETAILED DESCRIPTION OF EXEMPLARY EMBODIMENTS

In accordance with the preferred embodiment, the host processor does not execute any DCAS-specific code. Rather, all DCAS-specific code is implemented in a configurable secure (CS) processor that is in communication with the host processor. The host processor delivers commands to the CS processor, which the CS processor performs to configure itself. The CS processor then executes a downloaded DCAS software module that looks for the corresponding EMMs and ECMs, processes them to obtain the CW, and then uses the CW to decrypt the content stream.

Because no DCAS-specific code is implemented in the host processor, the host processor is not vulnerable to security risks. In addition, because it is not necessary for a DCAS kernel to be executed by the host processor, different DCAS kernels do not have to be designed for different host processors. Consequently, the amount of work and costs associated with implementing a given DCAS are reduced. Another benefit of the invention is that different DCASs can be implemented by simply reconfiguring the configurable CS processor in accordance with the new DCAS, and downloading a new DCAS software module to the reconfigured CS processor.

Figure 2:
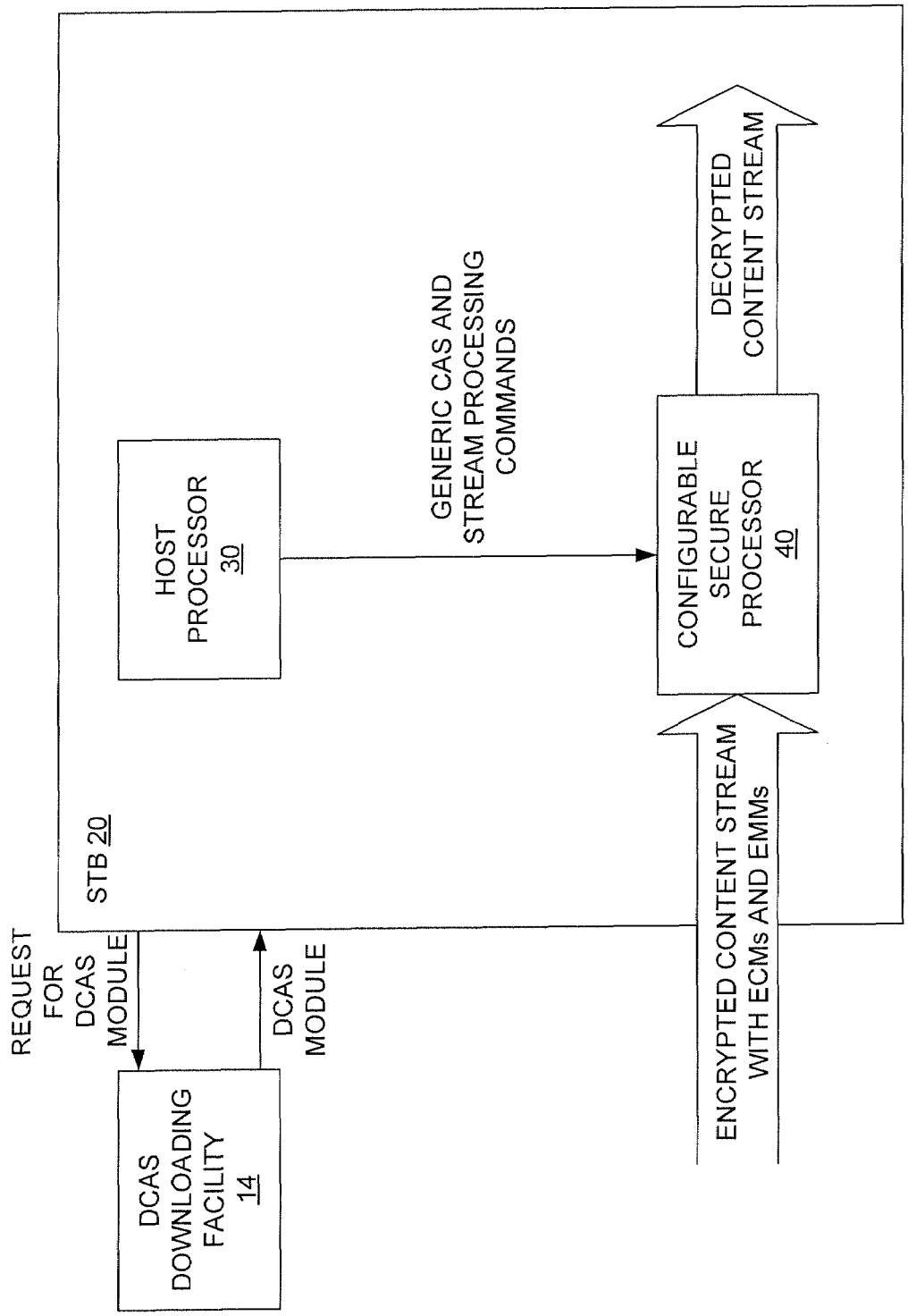
FIG. 2 illustrates a block diagram of the DCAS of the invention in accordance with one exemplary embodiment.

FIG. 2 illustrates a block diagram of a STB 20 that incorporates the subscriber premises portion of the DCAS of the invention. It should be noted, however, that it is not necessary for the subscriber premises portion of the DCAS of the invention to be incorporated into a STB. It is possible for a digital cable-ready television or other device to implement components that are capable of performing the functions that are typically performed in a STB, in which case the STB is not needed. For exemplary purposes only, the subscriber premises portion of the DCAS of the invention is shown as being part of an STB. It should also be noted that the architecture of the CS processor need not be tightly coupled to a particular access network, such as a cable. For example, the invention is equally applicable to satellite and IPTV delivery systems.

Figure 1:
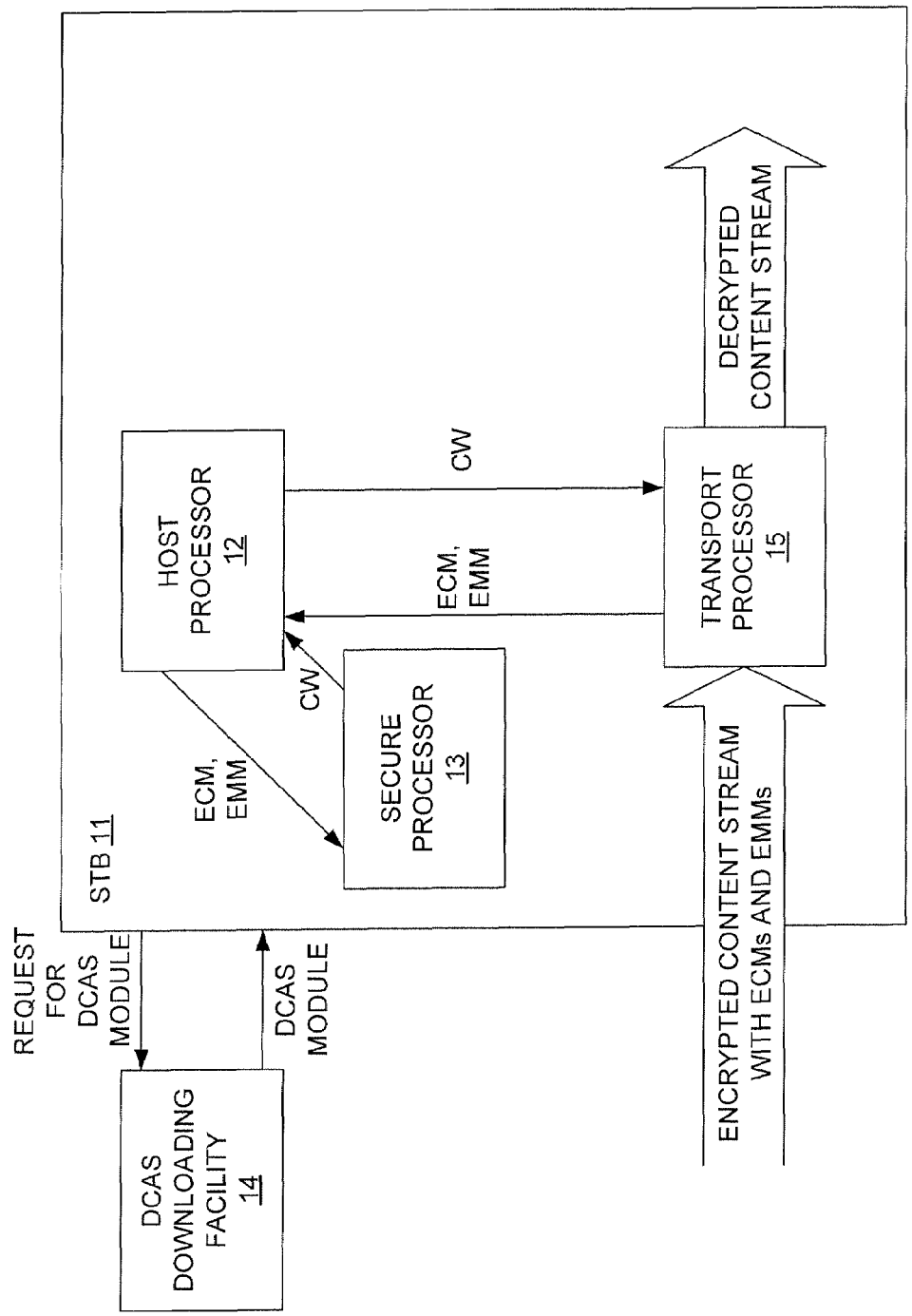
FIG. 1 illustrates a block diagram of a DCAS that has been proposed.

The STB 20 sends a request to download a DCAS software module to the DCAS downloading facility 14, which may be the same as the DCAS downloading facility 14 shown in FIG. 1. In response to this request, the DCAS downloading facility 14 transmits a DCAS software module to the STB 20, which is downloaded into the CS processor 40 of the invention. The host processor 30 sends generic CAS commands and stream processing commands to the reconfigurable client processor 40, which instruct the CS processor 40 to configure itself to look for the EMMs and ECMs based on the DCAS, and of the manner in which the encrypted content stream is to be processed.

Some exemplary generic CAS commands would include, for example, the following with their respective data returned from the CS processor (CSP) function to the host processor function making the API request.

| API Command Request | CSP Response |
| --- | --- |
| acquire_auth_stream (module) | module_auth_status |
| extract_services (module) | service list (e.g. PAT) |
| acquire_service (module, service) | service_status |

The above exemplary commands are shown in a generic fashion to highlight that the CSP and DCAS modules could be working with data in varying formats, such as MPEG packets or IP datagrams, for example. The first exemplary command, acquire_auth_stream, would be used to acquire system-level module authorization status. The related DCAS module residing in the CSP would seek and acquire its related system authorization stream and individual module authorization status therefrom, and return the resultant status in the response to the host processor.

A second exemplary command, extract_services, would be used by the host processor to obtain a listing of services available to the CSP. In the case of MPEG data streams, the service list would be represented by the presence of the Program Association Table (PAT). After returning the service list to the host processor, a consumer could make a selection from the list, thus causing the host processor to communicate an acquire_service message to the CSP. It is envisioned that the exemplary acquire_service message would result in decryption of the encrypted content stream if the downloaded CAS client were authorized for the selected service. In cases where the client were not authorized, the service status would return an appropriate error status.

Once configured, the CS processor 40 detects the corresponding EMM and ECM and analyzes the EMM to determine whether the subscriber is authorized to access the content. If the EMM indicates that the subscriber is authorized, the CS processor 40 decrypts the ECM and obtains the CW. The CS processor 40 then uses the CW to decrypt the encrypted content stream. If the EMM does not indicate that the subscriber has authorization to access the content, the encrypted content stream will not be decrypted.

It should be noted that unlike the known proposed DCAS system shown in FIG. 1 in which the CWs are transmitted between the host processor IC 12 and the transport processor IC 15, and thus subject to being accessed by a hacker and used to obtain unauthorized access to restricted content, the CWs are never transmitted outside of the CS processor 40. This makes it extremely difficult or impossible for a hacker to obtain access to the CWs, and therefore makes the DCAS more secure and less vulnerable to attacks.

Figure 3:
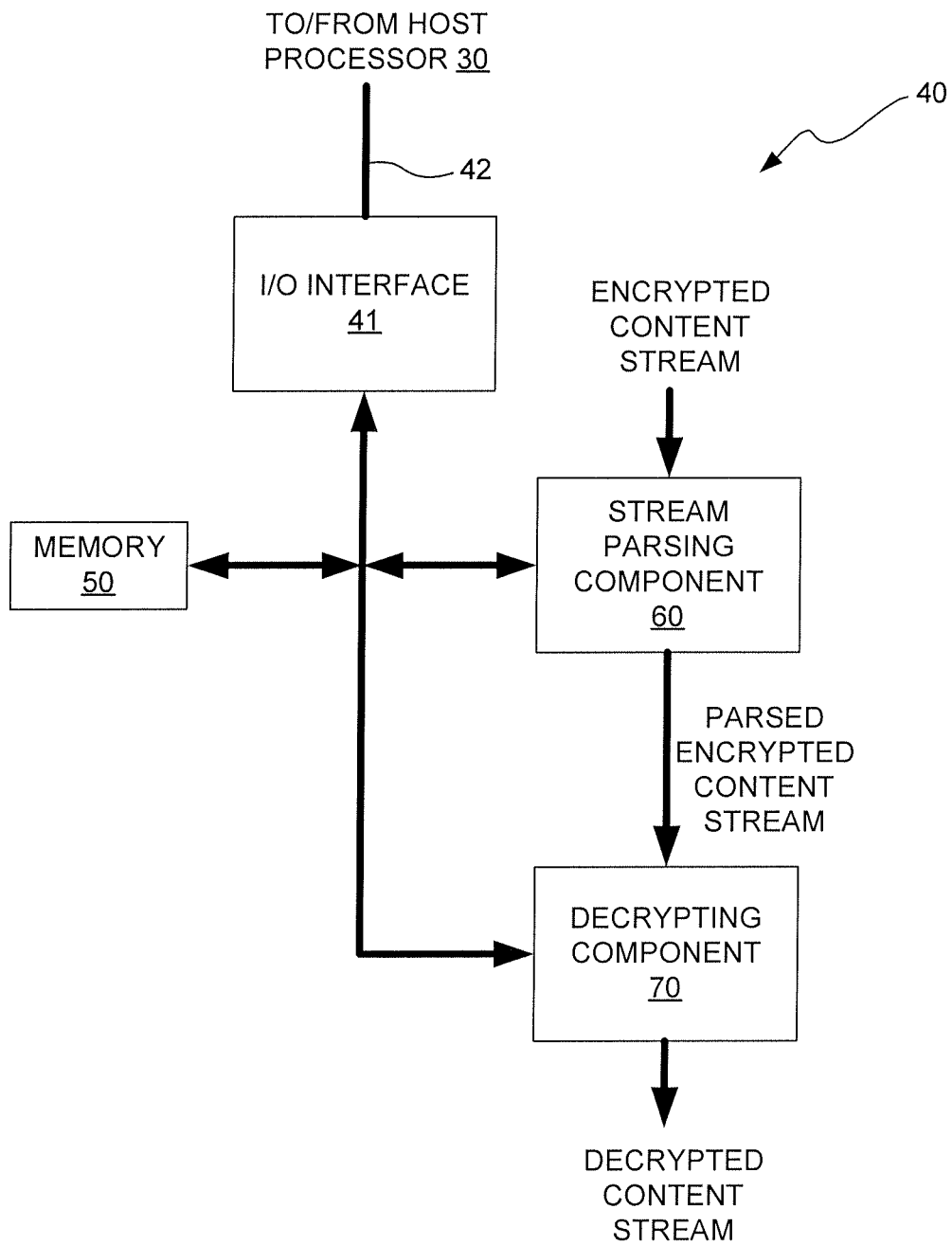
FIG. 3 illustrates a block diagram of the configurable secure (CS) processor shown in FIG. 2 in accordance with an exemplary embodiment.

FIG. 3 illustrates a block diagram of the CS processor 40 of the invention in accordance with an exemplary embodiment. The CS processor 40 is typically an integrated circuit (IC), such as, for example, an application specific integrated circuit (ASIC). However, the CS processor 40 may be any device capable of performing the functions described herein, including, for example, a microprocessor, a microcontroller, a field programmable gate array (FPGA), a programmable logic array, etc. Also, the CS processor 40 may be implemented in hardware, software, firmware, or a combination of hardware, software and/or firmware. The term "processor", as that term is used herein, is intended to denote these and any other implementations of suitable computational devices.

Likewise, the host processor 30 may be any device capable of performing the functions described herein with reference to the host processor 30, including, for example, a microprocessor, a microcontroller, a field programmable gate array (FPGA), a programmable logic array, etc. Also, the host processor 30 may be implemented in hardware, software, firmware, or a combination of hardware, software and/or firmware. The host processor 30 is typically a microprocessor. In addition, it is not necessary for the host processor 30 and the CS processor 40 to be separate ICs. Rather, the functionality performed by both processors 30 and 40 may be implemented in a single IC, such as, for example, in a system on a chip (SOC) IC.

The CS processor 40 typically includes an input/output (I/O) interface 41 for communicating with the host processor 30, a memory element 50 for storing the downloaded DCAS software module and data, a stream parsing component 60 for parsing the encrypted content stream to locate the ECMs and EMMs, and a decrypting component 70 for decrypting the encrypted content stream.

The host processor 30 and the CS processor 40 are typically mounted on a printed circuit board (PCB) or the like, and are in communication with each other via a PCB bus 42. The I/O interface 41 of the CS processor 40 receives the CAS and stream processing commands sent over the bus 42 from the host processor 30. Some of the commands are used by the CS processor 40 to configure the stream parsing component 60. Some of the commands are used by the CS processor 40 to configure the decrypting component 70. Commands and data are typically stored in memory element 50. The memory element 50 also stores the downloaded DCAS software module, which is typically received by the host processor 30 from the DCAS downloading facility 14 and communicated to the CS processor 40.

The stream parsing component 60 executes code of the DCAS software module that enables it to parse the encrypted content stream to locate the EMMs and ECMs, check the EMM to determine whether the subscriber is authorized to access the corresponding content, and extract the CW from the ECM in cases where the EMM indicates that the subscriber is authorized to access the content. The extracted CW is sent to the decrypting component 70, which uses the CW to decrypt the encrypted content stream and then outputs the decrypted content stream.

As stated above, the CS processor 40 is capable of being reconfigured if a new or different DCAS is to be used. To reconfigure the CS processor 40, the host processor 30 downloads the DCAS software module and forwards it to the CS processor 40, which stores it in memory element 50. The host processor 30 then sends commands that are specific to the DCAS to the CS processor 40, which it uses to reconfigure the stream parsing and decrypting components 60 and 70, respectively. It should be noted that the CS processor 40 may have multiple DCAS software modules corresponding to different DCASs stored in memory element 50. The host processor 30 is capable of configuring the CS processor 40 to execute any one of these DCAS software modules based on the encryption scheme being used at the headend.

For example, if certain cable television headend signals are protected by two conditional access systems, DCAS1 and DCAS2, and if a customer desires to tune between the services protected by DCAS1 and DCAS2, then the host processor 30 will configure the CS processor 40 to use the appropriate DCAS for each respective service, and switch back and forth as required to respond to tuning requests by the customer. Furthermore, if a customer wishes to view or record services protected by DCAS1 and DCAS2 simultaneously, such as for the purpose of watching a service protected by DCAS1, while at the same time recording a service protected by DCAS2, then the host processor 30 will configure the CS processor 40 to simultaneously process services protected by DCAS1 and DCAS2.

It should also be noted that the CS processor 40 may be programmed with additional digital rights management (DRM) capabilities to enable it to support distribution tasks external to the device in which content is initially consumed.

The host processor 30 executes an application programming interface (API) software program for communicating with the CS processor 40. This API analyzes the downloaded DCAS to determine how the CS processor 40 needs to be configured to perform the stream parsing and decrypting operations. The API executed by the host processor 30 preferably uses a command set that is generic to all available DCASs, which enables the CS processor 40 to be configured to perform the stream parsing and decrypting operations necessary for any DCAS. In addition, the host processor 30 is freed from having to perform any DCAS-specific functions, which reduces or eliminates security risks and eliminates the need to port a DCAS kernel into the host processor 30.

Figure 4:
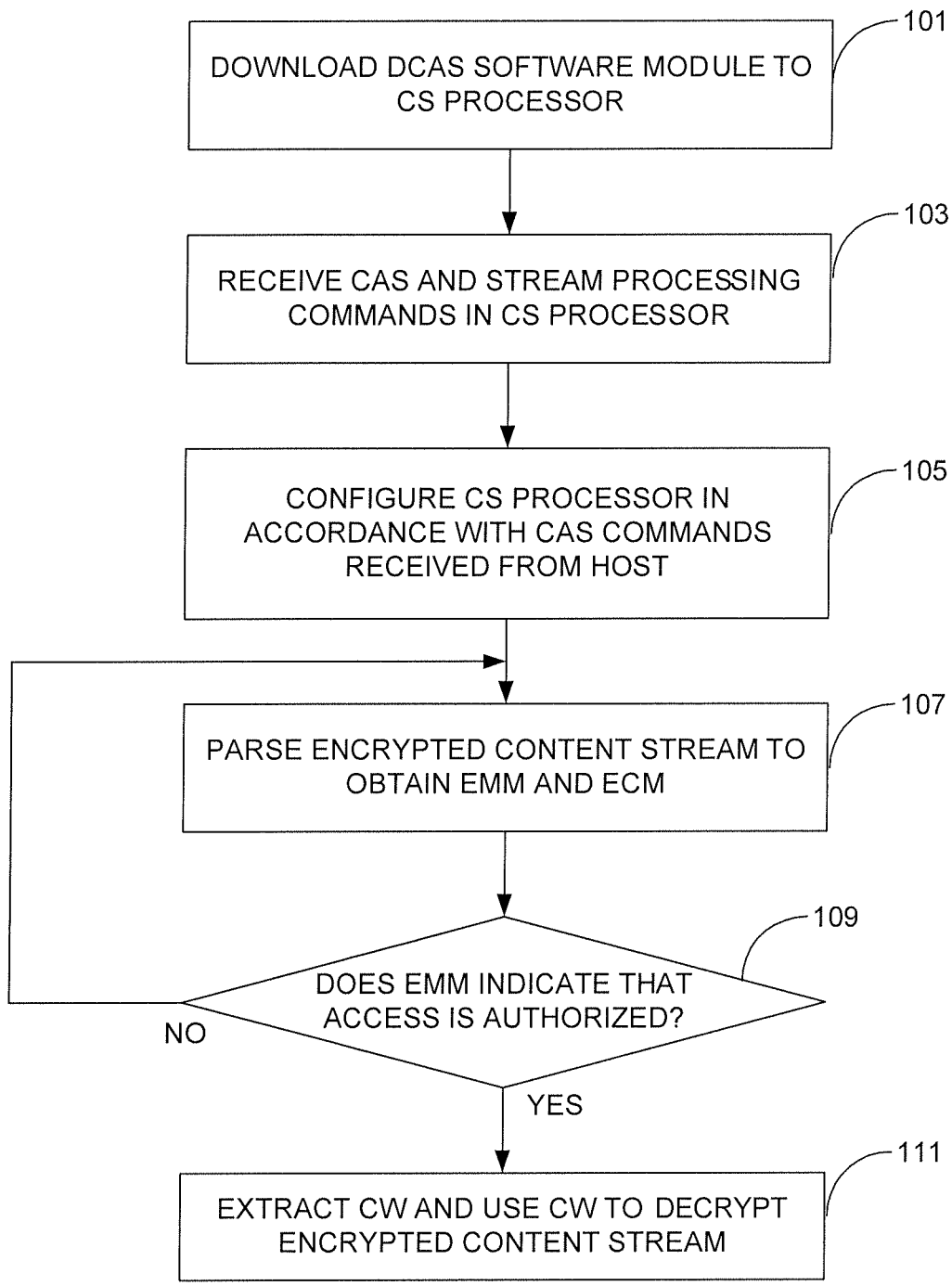
FIG. 4 illustrates a flowchart that represents the method of the invention in accordance with an exemplary embodiment performed by the CS processor.

FIG. 4 illustrates a flowchart that demonstrates the method of the invention in accordance with an exemplary embodiment for processing an encrypted content stream. It should be noted that the steps represented by the blocks in the flowchart do not have to be depicted in the order shown in FIG. 4, or in any particular order. A DCAS software module is downloaded to the CS processor, as indicated by block 101. CAS and stream processing commands are sent from the host processor to the CS processor, as indicated by block 103. The CS processor configures itself in accordance with the received DCAS commands, as indicated by block 105. The encrypted content stream is then parsed and the EMMs and ECMs are located, as indicated by block 107. A determination is then made as to whether the EMM indicates that access to the content is authorized, as indicated by block 109. If so, the CW is extracted and the encrypted content stream is decrypted using the CW, as indicated by block 111. If not, the CS processor continues to parse the content stream and look for the EMMs and ECMs.

Figure 5:
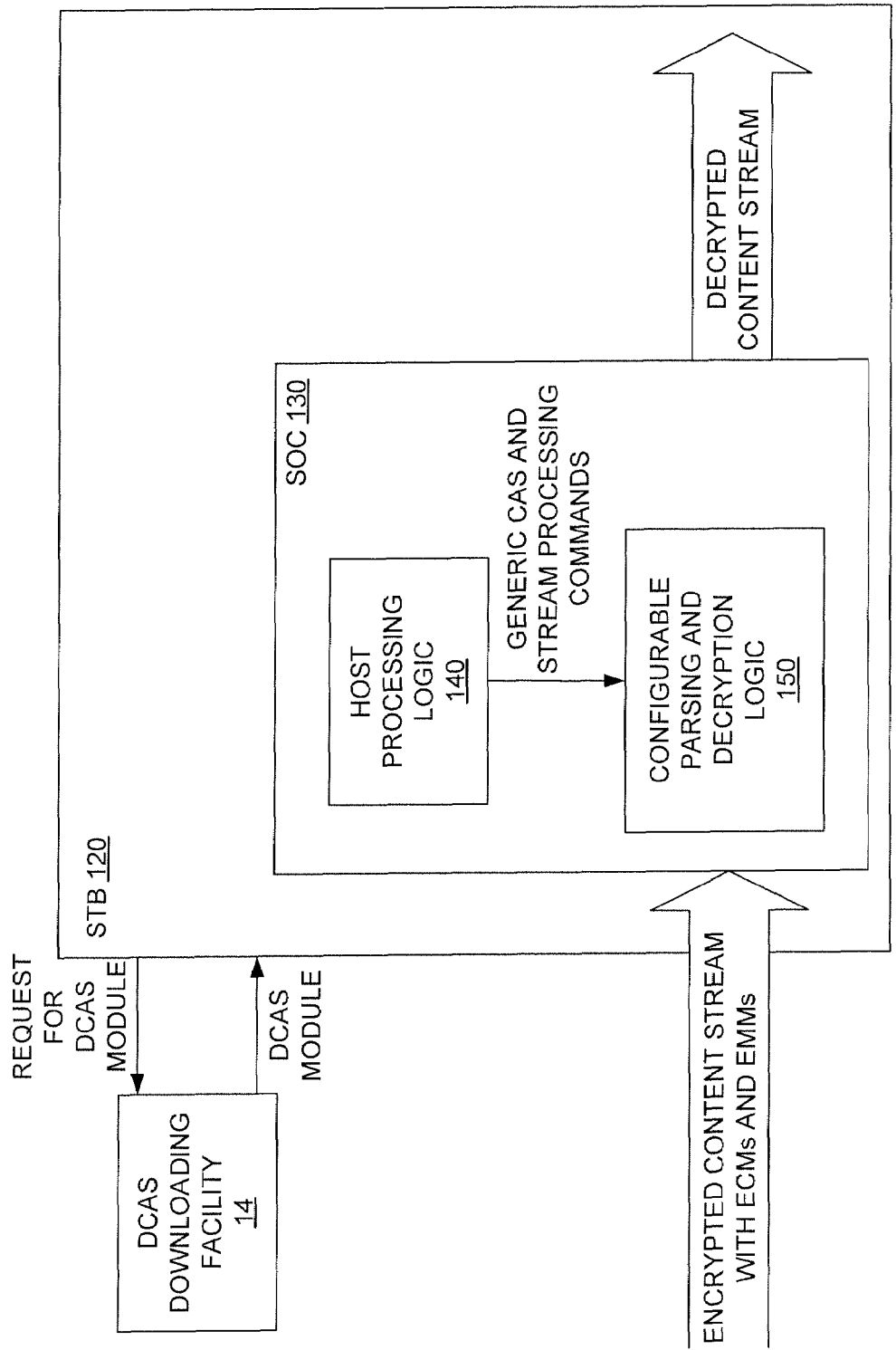
FIG. 5 illustrates another exemplary embodiment in which the functionality described above with reference to FIG. 2 as being performed by the host and CS processors is implemented in a single IC, such as in a System on Chip (SOC).

FIG. 5 illustrates another exemplary embodiment in which the functionality described above with reference to FIG. 2 as being performed by the ICs that contain the host and CS processors 30 and 40 is implemented in a single IC 130, such as in a SOC, for example. In accordance with this embodiment, the STB 120 incorporates the SOC 130, which comprises host processing logic 140 and a CS processing logic 150. The host processing logic 140 of the SOC 130 performs the functions described above with reference to FIG. 2 as being performed by the host processor IC 30. The CS processing logic 150 of the SOC 130 performs the functions described above with reference to FIG. 2 as being performed by the CS processor IC 40 to parse and decrypt an encrypted content stream. The SOC 130 provides the same advantages as described above with reference to FIG. 2, but provides some additional advantages, such as, for example, costs can be reduced by using a single IC to perform all of the functions associated with configuring the CS processing logic 150 and parsing and decrypting the content stream, no information is communicated between different ICs, which makes the system less susceptible to attacks and even more difficult for hackers to obtain information that may be used to gain access to restricted content.

It should be noted that the invention has been described with reference to particular examples and that the invention is not limited to the examples described herein. For example, although the CS processor 40 has been described with reference to FIG. 2 as being a single IC, it may instead be made up of a combination of ICs or other devices that operate in conjunction with each other to perform the aforementioned operations. Those skilled in the art will understand that modifications may be made to the examples described above and that all such modifications are within the scope of the invention.

The process shown in FIG. 4 may be implemented in a general, multi-purpose or single purpose secure processor. Such a processor will execute instructions, either at the assembly, compiled or machine-level, to perform that process. Those instructions can be written by one of ordinary skill in the art following the description of FIG. 4 and stored or transmitted on a computer readable medium. The instructions may also be created using source code or any other known computer-aided design tool. A computer readable medium may be any medium capable of carrying those instructions and include a CD-ROM, DVD, magnetic or other optical disc, tape, silicon memory (e.g., removable, non-removable, volatile or non-volatile), packetized or non-packetized wireline or wireless transmission signals.

What is claimed is:

1. An apparatus for providing conditional access (CA) in a downloadable CA system (DCAS), the apparatus comprising:
   a host processor; and
   a configurable secure (CS) processor in communication with the host processor and separate from the host processor, the CS processor being configured to:
      receive DCAS commands and content stream processing commands from the host processor and to configure itself in accordance with the received commands to parse and decrypt an encrypted content stream received by the CS processor from a source external to the CS processor and to the host processor, the CS processor decrypting the encrypted content stream by executing a DCAS software module that has been downloaded to the CS processor to identify an encrypted-content decryption key included in the encrypted content stream received by the CS processor,
      receive instructions from the host processor to be reconfigured by the host processor to parse and decrypt a second encrypted content stream that has been encrypted in accordance with a different downloadable CA system (DCAS) encrypting algorithm, wherein if the CS processor is reconfigured, a different DCAS software module that has been downloaded to the CS processor is executed by the processor to parse and decrypt the second encrypted content stream.

2. The apparatus of claim 1, wherein the CS processor comprises:
   an input/output (I/O) interface configured to enable the CS processor to communicate with the host processor;
   at least one memory element, the DCAS software module being stored in said at least one memory element;
   a stream parsing component configured to parse the content stream and obtain an Entitlement Control Message (ECM) and an Entitlement Management Message (EMM) from the encrypted content stream, the ECM including the encrypted-content decryption key, the EMM including information as to whether decryption of the encrypted content stream is authorized; and
   a decrypting component configured to decrypt the encrypted content stream if the information included in the obtained EMM indicates that decryption of the encrypted content stream is authorized, the decrypting component using the encrypted-content decryption key to decrypt the encrypted content stream.

3. The apparatus of claim 2, wherein said at least one memory element stores multiple DCAS software modules, each DCAS software module being associated with a respective downloadable CA system (DCAS) encrypting algorithm.

4. The apparatus of claim 1, wherein the CS processor receives instructions from the host processor to be configured and reconfigured by the host processor to parse and decrypt encrypted content streams that have been encrypted in accordance with different downloadable CA systems (DCASs) encrypting algorithms, wherein the host processor configures or reconfigures the CS processor depending on the DCAS encryption algorithm that has been used to encrypt a content stream that a user is attempting to access.

5. The apparatus of claim 4, wherein the CS processor receives instructions from the host processor to be configured by the host processor to simultaneously parse and decrypt content streams that have been encrypted in accordance with different DCAS encrypting algorithms.

6. The apparatus of claim 1, wherein the host processor and the CS processor are integrated into a single IC, the host processor comprising host processing logic and the CS processor comprising CS processing logic.

7. A method performed by a downloadable conditional access system (DCAS), the method comprising:
receiving a first DCAS software module in a configurable secure (CS) processor, the CS processor separate from a host processor;
receiving a first set of DCAS commands and stream processing commands in the CS processor from the, host processor, the CS processor configuring itself in accordance with the CAS commands and stream processing commands;
receiving an encrypted content stream in the CS processor from a source external to the CS processor and to the host processor; and
executing the received first DCAS software module in the CS processor to decrypt the encrypted content stream by the CS processor using the received first DCAS, the CS processor identifying an encrypted-content decryption key included in the encrypted content stream to decrypt the encrypted content stream,
receiving a second DCAS software module in the CS processor;
receiving a second set of DCAS commands and stream processing commands in the CS processor from the host processor, the CS processor reconfiguring itself in accordance with the second set of DCAS commands and stream processing commands; and
executing the second DCAS software module in the CS processor, wherein when the CS processor to decrypt the encrypted content stream by the CS processor using the received first DCAS, the CS processor identifying a second encrypted-content decryption key included in the encrypted content stream to decrypt the encrypted content stream.

8. The method of claim 7, wherein the first and second downloaded CAS software modules are executed concurrently by the CS processor such that multiple content streams that have been encrypted with different DCAS encrypting algorithms are simultaneously parsed and decrypted and are available to be simultaneously accessed by a user.

9. The method of claim 7, wherein the CS processor comprises a stream parsing component that parses the encrypted content stream and a decrypting component that decrypts the encrypted content stream, wherein the stream parsing component parses the encrypted content stream to obtain an Entitlement Control Message (ECM) and an Entitlement Management Message (EMM) from the encrypted content stream, the ECM including the encrypted-content decryption key, the EMM including information as to whether decryption of the encrypted content stream is authorized, and wherein the decrypting component uses the decryption key to decrypt the encrypted content stream if the obtained EMM indicates that decryption of the encrypted content stream is authorized.

10. The method of claim 7, further comprising:
prior to executing the DCAS software module, storing the DCAS software module in a memory element of the CS processor.

11. The method of claim 7, further comprising:
prior to executing the first DCAS software module, storing the first DCAS software module in a memory element of the CS processor; and prior to executing the second DCAS software module, storing the second DCAS software module in the memory element.

12. A non-transitory computer-readable medium having instructions encoded thereon that, when executed in a processor included in a downloadable conditional access system (DCAS), cause the DCAS to:
receive a first DCAS software module in a configurable secure (CS) processor, the CS processor separate from a host processor;
receive a first set of DCAS commands and stream processing commands in the CS processor from the host processor, the CS processor configuring itself in accordance with the DCAS commands and stream processing commands;
receive an encrypted content stream in the CS processor from a source external to the CS processor and to the host processor; and
execute the DCAS software module in the CS processor to decrypt the encrypted content stream by the CS processor using the received first DCAS, the CS processor identifying an encrypted-content decryption key included in the encrypted content stream to decrypt the encrypted content stream, wherein when the CS processor executes the DCAS software module, the CS processor parses and decrypts the encrypted content stream,
receive a second DCAS software module in the CS processor:
receive a second set of DCAS commands and stream processing commands in the CS processor, the second set of commands being sent to the CS processor by the host processor, the CS processor reconfiguring itself in accordance with the second set of CAS commands and stream processing commands; and
execute the second DCAS software module in the CS processor, wherein when the CS processor executes the second DCAS software module, the encrypted content stream is parsed and decrypted.

13. The non-transitory computer readable medium of claim 12, wherein when the content stream is parsed, an Entitlement Control Message (ECM) and an Entitlement Management Message (EMM) are obtained from the encrypted content stream, the ECM including an encrypted-content decryption key, the EMM including information as to whether decryption of the encrypted content stream is authorized, and wherein if the obtained EMM indicates that decryption of the encrypted content stream is authorized, the decryption key is used to decrypt the encrypted content stream.

14. The non-transitory computer readable medium of claim 12, further comprising instructions, that when executed by the processor cause the DCAS to:
store the DCAS software module in a memory element of the CS processor prior to the DCAS software module being executed in the CS processor.

15. The non-transitory computer readable medium of claim 12, further comprising instructions, that when executed by the processor cause the DCAS to:
store the first DCAS software module in a memory element of the CS processor prior to the first DCAS software module being executed in the CS processor; and
store the second DCAS software module in the memory element prior to executing the second DCAS software module.

* * * * *